(12) United States Patent
Blot-Carretero et al.

(10) Patent No.: US 6,568,189 B2
(45) Date of Patent: May 27, 2003

(54) PROCESS FOR CONTROLLING THE PRESSURE AND DELIVERY OF A FUEL FEED TO A SERVOVALVE UNIT

(75) Inventors: Marie-Trinité Rose Blot-Carretero, Maincy (FR); Jean-Marie Brocard, Rubelles (FR); Philippe Galozio, Lieusaint (FR); Claude Marcel Maillard, Vulaines sur Seine (FR)

(73) Assignee: Snecma Moteurs, Paris (FR)

( * ) Notice: Subject to any disclaimer, the term of this patent is extended or adjusted under 35 U.S.C. 154(b) by 0 days.

(21) Appl. No.: 10/214,702

(22) Filed: Aug. 9, 2002

(65) Prior Publication Data

US 2002/0184885 A1 Dec. 12, 2002

Related U.S. Application Data

(62) Division of application No. 09/805,036, filed on Mar. 14, 2001.

(30) Foreign Application Priority Data

Mar. 16, 2000 (FR) .............................................. 00 03359

(51) Int. Cl.⁷ ................................................. F02C 7/22
(52) U.S. Cl. ....................................................... 60/772
(58) Field of Search ............................. 60/39.281, 734, 60/772, 776

(56) References Cited

U.S. PATENT DOCUMENTS

| 4,245,470 A | 1/1981 | Briotet |
| 4,607,486 A | 8/1986 | Cole ............................ 60/734 |
| 4,846,210 A | 7/1989 | Loxley |
| 4,899,535 A | 2/1990 | Dehan et al. |
| 5,116,362 A | 5/1992 | Arline et al. .................. 60/734 |
| 5,209,058 A | 5/1993 | Sparks et al. ............ 60/39.281 |
| 5,715,674 A | 2/1998 | Reuter et al. |

FOREIGN PATENT DOCUMENTS

EP      0 311 746      4/1989

Primary Examiner—Louis J. Casaregola
(74) Attorney, Agent, or Firm—Oblon, Spivak, McClelland, Maier & Neustadt, P.C.

(57) ABSTRACT

A device for controlling fuel pressure and delivery as necessary for the operation of the servovalves of an aircraft engine is disposed downstream of a fuel injector feed unit of the engine. The device comprises a chamber maintained at the servovalve feed pressure by the movement of a closure member to vary the opening of a port of the chamber. The closure member moves under the action of opposing forces comprising inter alia a force in the opening direction proportional to the servovalve feed pressure. An equilibrium position of the closure member is a function of pressure resulting from the engine speed. An injector delivery control loop is therefore isolated from a servovalve pressure and delivery control loop.

1 Claim, 1 Drawing Sheet

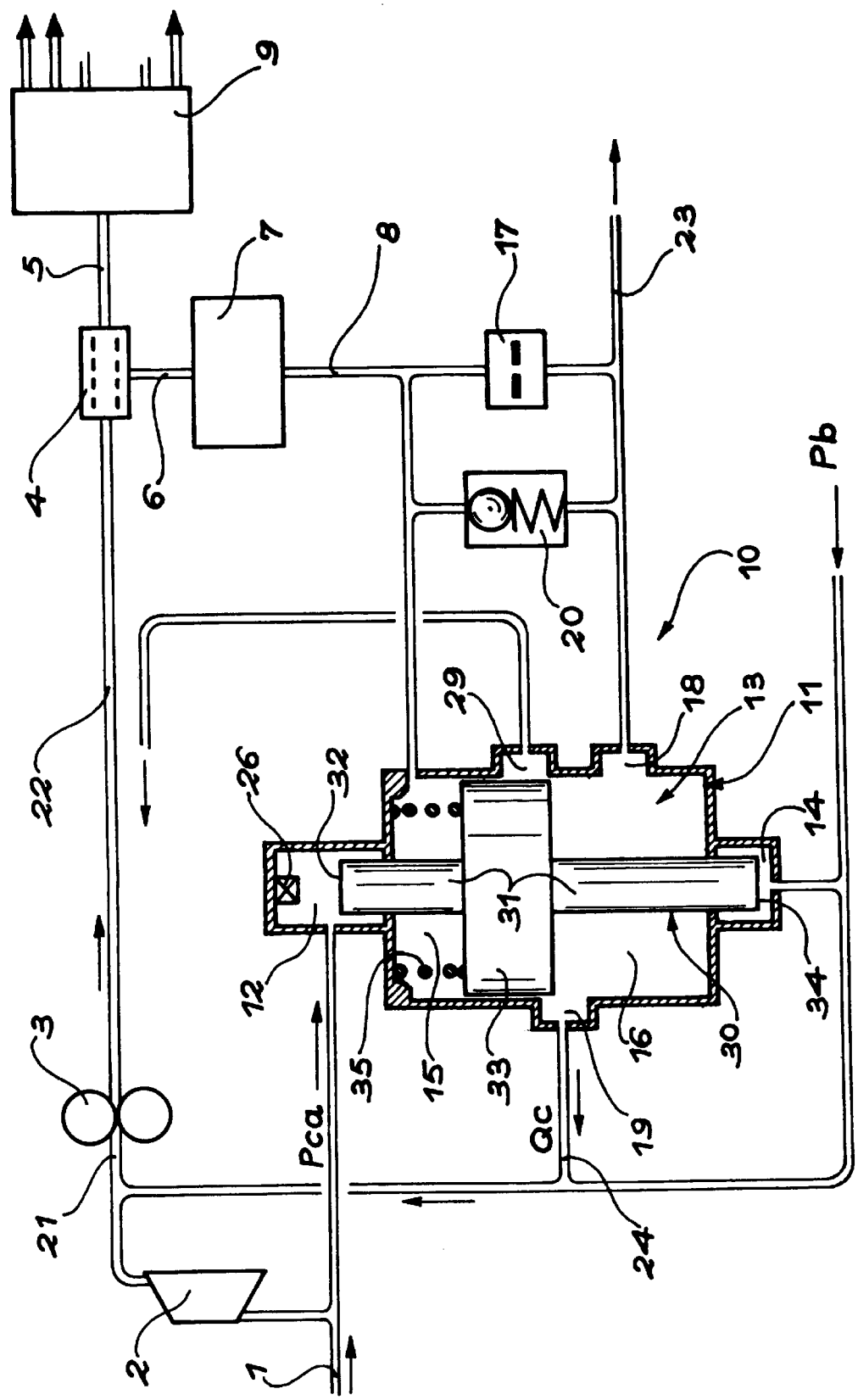

PROCESS FOR CONTROLLING THE PRESSURE AND DELIVERY OF A FUEL FEED TO A SERVOVALVE UNIT

This application is a Division of application Ser. No. 09/805,036 filed on Mar. 14, 2001.

BACKGROUND OF THE INVENTION

1. Field of the Invention

The invention relates generally to hydromechanical devices for metering the delivery and pressure of a fuel feed to a hydraulic servovalve unit which is driven by the fuel. The invention also relates to a fuel supply circuit comprising said device and to a process for controlling the pressure and delivery of the fuel to a servovalve unit.

2. Technological Background

In an aircraft engine the fuel is supplied to fuel injectors at which the fuel is burned to provide the propulsive power and the power for feeding engine auxiliaries. The fuel is also used as a cooling liquid in heat exchangers, and also to operate a plurality of hydraulic servovalves. For example, nozzles and other variable-geometry elements are operated by hydraulic rams which are driven by a supply of the fuel under pressure.

The servovalves are usually supplied from a central servovalve feed unit whose pressure must remain constant and whose delivery must be capable of being varied in accordance with servovalve requirements.

The supply circuit for the injectors, exchangers and central servovalve feed unit comprises a low pressure pump which raises fuel coming from the aircraft tanks at an initial pressure Pca to a pressure Pb, a high pressure pump which further raises the fuel to a pressure higher than that required for the injectors and the servovalve feed unit. Unused fuel is recycled. The proportion of recycled fuel relative to consumed fuel must not be excessive since the fuel is heated by its passage through the high pressure pump and is therefore less suitable as a cooling liquid. The high pressure pump may be a pump whose delivery is determined solely by its speed of rotation. This speed is in turn a function of engine speed. The pump may also be a pump whose delivery is a function not only of its speed but also of another parameter which can be so controlled that a pump running at a given speed can provide different delivery rates.

As explained in U.S. Pat. No. 5,715,674 to Reuter, variable delivery pumps have the advantage over fixed pumps of being able to deliver a fuel flow rate theoretically adapted to the instantaneous delivery required for engine operation.

The term "theoretically" is used because, as explained in the said Reuter patent, the pump response time is not negligible. More particularly, the servovalves introduce erratic delivery variations requiring a control bandwidth at frequencies incompatible with pump control capacities whether the pump is of the variable geometry kind or of the fixed delivery kind. Excessive response times may lead to decrease in deliveries to the engine fuel injectors and/or malfunction of the servomechanisms operated by the pressurised fuel.

To overcome this problem the Reuter patent provides a pump control valve having an outlet connected to an element for controlling the delivery of the pump. The operation of the valve is not explained and, in particular, it is not clear how the pump can provide a better transient response time as stated in the last two lines of column 6 and the first line of column 7 of Reuter. It is clear, however, that the valve is an essential element of a control loop aimed at reducing as much as possible the delivery of the pump. This delivery is theoretically maintained at a level slightly above the level necessary to cover the delivery demanded by the engine fuel injectors and the delivery demanded at any instant by the servovalves.

Although such a device is an improvement over the prior art it does not provide a response time short enough to meet the requirements of the servovalves controlling various elements of the engine.

SUMMARY OF THE INVENTION

The inventors have realised that the response time of variable delivery pumps is short enough for a control loop comprising such a pump to control the fuel delivery to the engine fuel injectors without major problems. The latter delivery varies in accordance with known laws in dependence upon engine speed and other parameters such as temperature and the external pressure, which it is possible to monitor continuously so that they are known at any instant. Since the engine is a high inertia device its speed of rotation varies slowly. Similar considerations apply to the other parameters affecting the delivery consumed by the injectors.

The invention is therefore based on isolating the injector delivery control loop from the servovalve feed control loop.

To this end, the delivery required from the high pressure pump at any instant needs to be the sum of the delivery required by the engine fuel injectors at that instant plus the maximum delivery which may be required by the servovalves.

The maximum servovalve delivery is the delivery which would be necessary if all the servovalves were simultaneously each to demand the maximum delivery consumable by that servovalve. The sum of the maximum deliveries to all the servovalves for a given engine speed is therefore a known constant, so that the delivery variations of the pump are solely the variations of the fuel injector consumption. Delivery to the fuel injectors is therefore readily controllable.

When the required portion of the pump delivery has been delivered to the fuel injectors, the remainder of the delivery is sufficient to meet all servovalve requirements in all circumstances.

The invention therefore provides a pressure and delivery control loop for fuel directed to a servovalve feed unit downstream of a fuel injector feed unit, comprising a fuel intake at a first pressure and at a constant controlled delivery and a control device for keeping the pressure of the feed unit constant whatever the consumption of said unit and the variations of the various fuel pressures in dependence upon the engine speed and upon the other parameters affecting the pressures.

In an embodiment of the invention the pressure control device comprises a chamber for providing this constant pressure. The chamber communicates with the feed unit and, by way of a variable cross-section outlet port, with a portion of the fuel circuit between the high pressure pump and the low pressure pump.

The cross-section of the outlet port is varied in dependence upon the position of a first shutter which moves around a variable equilibrium position. This position is a function of the pressure difference between a first pressure downstream of the low pressure pump and upstream of the high pressure pump and a second pressure upstream of the low pressure pump. The movements of the first shutter around the variable equilibrium position are a function of the fuel consumed by the servovalve feed unit.

The variation of the port cross-section around the variable equilibrium position is effected, as explained above, by means of a first shutter movable in response to two opposing forces. One of these forces is provided by the combined action of the second pressure and of resilient means, such as a spring, and the other force is provided by the action of the first pressure on the shutter.

Variation of the port cross-section around the equilibrium position in dependence upon feed unit consumption is effected by the movement of a second movable shutter which is movable in response to two opposing forces. One of these forces is provided by the pressure forces exerted by the fuel combined with resilient forces created, for example, by a spring. The other force is created by fuel pressure forces. One of these other forces is created by fuel at the pressure of the servovalve feed. Consequently, a decrease in the latter pressure reduces the latter force and therefore leads to a closing movement of the second shutter.

For the sake of simplicity and improved reliability, the two shutters of the chamber are merged to form a single element formed by part of a movable spool which variably masks the opening of the outlet port. The spool has two ends and an intermediate part forming a piston.

The spool piston divides a compartment into two half-chambers, namely a first half-chamber and a second half-chamber, the latter being at the controlled servovalve feed pressure. The first half-chamber communicates with the upstream side of a diaphragm, and the second half-chamber communicates with the downstream side of the diaphragm. The upstream side of the diaphragm receives fuel originating from the high pressure pump, preferably through a filter. A spring applies a pressure to the spool in a direction towards the second half-chamber.

The first end of the spool is subjected to the pressure Pca and its opposite end is subjected to the pressure Pb.

The forces acting on the spool and tending to reduce the opening of the outlet port are:
  the force exerted by the pressure Pca acting on the first end of the spool;
  the force of the spring; and
  the force exerted by the pressure upstream of the diaphragm and acting on the spool piston.

The opposing forces acting on the spool and tending to increase the opening of the outlet port are:
  the force exerted by the pressure Pb acting on the second end of the spool; and
  the force exerted by the pressure downstream of the diaphragm and acting on the spool piston.

The parameters on which a direct action is possible by design and which must be considered in order to obtain a constant controlled pressure in dependence upon servovalve delivery are:
  the cross-sectional areas of the first and second ends of the spool;
  the diaphragm cross-section;
  the elastic coefficient of the spring; and
  the area of the spool piston.

In summary, according to the invention, in a fuel supply circuit of an aircraft engine including fuel injectors and a plurality of servovalves, a low pressure pump for raising the pressure of fuel from a tank from a pressure Pca to a pressure Pb, and a high pressure pump and filter for further raising the pressure of the fuel to a pressure Psf at the outlet of said filter, there is provided a device for controlling the pressure and delivery of fuel to said plurality of servovalves comprising:
  a compartment divided in a sealed manner to define a first end chamber, an intermediate chamber, and a second end chamber;
  a spool movable in said compartment and having first and second end portions and an intermediate portion;
  said first end portion being engaged in a sealed manner in said first end chamber;
  said intermediate portion including a piston dividing said intermediate chamber in a fluid tight manner into first and second half-chambers;
  means for communicating said first end chamber with fuel at the pressure Pca;
  means for communicating said second end chamber with fuel at the pressure Pb;
  a first outlet port in said intermediate chamber in communication with fuel at said pressure Pb;
  resilient means disposed in said first half-chamber and acting to urge said spool in the direction of said second end chamber;
  diaphragm means having an inlet and an outlet;
  said inlet being connected to receive fuel at the pressure Psf and also being connected to said first half-chamber;
  said outlet being connected to a fuel feed line to said servovalves and also being connected to said second half-chamber;
  said spool being movable in said compartment in response to forces exerted on said spool by said resilient means and the fuel pressures applied to said first and second end chambers and to said first and second half-chambers to cause said piston to vary the opening of said first outlet port.

Preferably, the cross-sectional areas of the first and second ends of the spool are identical. Consequently, the force tending to increase the outlet port opening is proportional to the pressure difference Pb−Pca. This pressure difference is in turn proportional to the square of the engine speed. The delivery through the diaphragm is proportional to the pressure upstream thereof.

Consequently, the delivery passing through the control device and consisting of the sum of the delivery to the servovalves and the return delivery from the exit of the variable outlet port of the second half-chamber is proportional to engine speed, at least within a certain range.. This characteristic is well adapted to the delivery necessary for the servovalves, whose requirements increase with engine speed.

The invention also provides a process for controlling the pressure and delivery of fuel to said plurality of servovalves of an aircraft engine, comprising the steps of:
  controlling the high pressure pump delivery so that, whatever the engine speed, the delivery from said high pressure pump corresponds to the sum of the delivery required by said fuel injectors at said engine speed and the prevailing flight conditions and the delivery which would be required by said plurality of servovalves if all of said servovalves operate simultaneously using the maximum delivery usable at said engine speed;
  placing a servovalve feed unit downstream of a fuel injector feed unit and in communication with a compartment having an opening which is variable in dependence upon the position of a movable closure member; and, causing said closure member to move to vary said opening in response to opposing first and second groups of forces, said first group of forces acting in the closing direction and comprising a resilient force, a force proportional to the pressure Pca, and a force proportional to a first pressure, and said second group of forces acting in the opening direction and comprising a force proportional to the pressure Pb, and a force proportional to a second pressure less than the first pressure and at a substantially constant difference therefrom.

BRIEF DESCRIPTION OF THE DRAWINGS

FIG. 1 is a schematic diagram of an aircraft engine fuel supply circuit incorporating an embodiment of a servovalve delivery control device in accordance with the invention.

DESCRIPTION OF THE PREFERRED EMBODIMENT

The fuel supply circuit of FIG. 1 is shown in very simplified form, only the connections of the servovalve control device being shown, elements such as filters, heat exchangers and bypasses which are conventionally used in aircraft fuel supply circuits being omitted.

The fuel arrives from an aircraft fuel tank via a line 1 at a pressure Pca. Its pressure is raised by a low pressure feed pump 2 which delivers fuel at a pressure Pb. The fuel leaving the pump 2, together with fuel from a return line which will be referred to hereinafter, are delivered via a line 21 to a high pressure pump 3 whose output is adjustable according to the drive speed.

In accordance with the invention, the controlled delivery from the pump 3 is equal to the sum of the delivery needed to supply the engine fuel injectors and the maximum possible delivery which may be consumed by the hydromechanical devices which use the pressurized fuel as the hydraulic driving fluid. Consequently, the delivery variations to be accommodated by the pump 3 are merely the variations in the delivery to the engine fuel injectors. These variations are slow enough to be controlled without difficulty. More particularly, they are compatible with the pump response time.

The fuel from the pump 3 passes through a line 22 to a self-cleaning filter 4 which, in known manner, has an outlet 5 for unfiltered fuel and an outlet 6 for filtered fuel.

The unfiltered fuel is delivered to a unit 9 for metering fuel to the engine fuel injectors. The filtered fuel from the outlet 6 is directed through a heater 7 before being supplied for use by servovalves operating mechanisms of the engine.

In accordance with the invention a device 10 is provided to maintain a constant servovalve feed pressure whatever delivery is taken by the servovalves which drive the engine mechanisms.

The device 10 therefore receives, via line 8, a fuel delivery which is substantially equal to the maximum possible delivery required if all of the servovalves are to be operated simultaneously. The proportion of the fuel actually required by the servovalves is delivered by the delivery control device 10 through a line 23 to the servovalves, and the unused proportion is returned via a line 24 to the line 21 feeding the high pressure pump 3 as previously stated.

The servo delivery control device basically comprises a compartment 11 divided into three chambers which are sealed from one another, namely a top chamber 12, an intermediate chamber 13, and a bottom chamber 14. The words "top" and "bottom" are used merely to differentiate the chambers from one another. In the actual equipment the chambers can have positions relative to one another which are different as regards their respective levels. If preferred the top and bottom chambers may be referred to as first and second chambers respectively.

In this embodiment a spool 30 is slidably mounted in the compartment 11, the spool 30 comprising a rod 31 having a shoulder 33 forming a piston in the intermediate chamber 13. The top end 32 of the rod extends sealingly into the top chamber 12, and the bottom end 34 of the rod extends sealingly into the bottom chamber 14. The intermediate chamber 13 is divided by the piston 33 into two half-chambers, namely an upper intermediate half-chamber 15 and a lower intermediate half-chamber 16.

The filtered fuel delivered to the device 10 via line 8 has a pressure Psf and is supplied to the upper half-chamber 15 and to the inlet of a diaphragm device 17. The outlet of the diaphragm device 17 communicates with the servovalve feed line 23 and with the lower half-chamber 16 though a port 18 thereof.

Fuel not used by the servovalves exits the lower half-chamber 16 through a variable cross-section outlet port 19 for recycling via lines 24 and 21. The opening of the outlet port 19 is controlled by movement of the piston 33 within the intermediate chamber 13.

A spring 35 is disposed in the upper half-chamber 15 and bears on the piston 33 to apply thereto a force tending to move it towards the lower half-chamber.

The position adopted by the piston 33 in the intermediate chamber 13 is a function of the force exerted by the spring 35, the pressure Pca of the fuel acting on the top end 32 of the spool 30, and the pressure Pb of the fuel acting on the bottom end 34 of the spool 30. Also, the pressure difference Pb−Pca is proportional to the square of the number of engine revolutions since the pumps 2 and 3 rotate at speeds proportional to the number of engine revolutions per minute.

Also, the diaphragm 17 maintains a constant pressure difference between its inlet and outlet sides, and the position of the spool 30 is also controlled by this pressure difference because the pressure Psf acts on the top surface of the piston 33 and the pressure at the outlet of the diaphragm 17 acts on the bottom surface of the piston 33.

In the equilibrium state the pressure in the bottom chamber is equal to the pressure necessary to feed the servovalves—i.e., the fuel delivery arriving through the diaphragm 17 and the fuel delivery Qc escaping through the port 19 of the intermediate chamber 13 are such as to produce the latter pressure.

Let us now assume that, with all other factors remaining the same, in particular the engine speed and therefore the pressures Pb and Psf, a servovalve calls for fuel. This will cause the pressure in the lower half-chamber 16 to drop, and the pressure Psf in the upper half-chamber 15 and the spring 35 will urge the piston 33 downwards with the result that the area of the port opening 19, and therefore the flow therethrough, is reduced until a new equilibrium state is reached. In the case of a pressure increase the converse phenomenon (upward movement of the piston) leads to an increase of the delivery through the port 19.

Clearly, therefore, from a variable equilibrium position dependent upon the pressures supplied by the pumps, the spool will move to keep the pressure available for the servovalves constant whatever the servovalve demand may be.

Preferably, safety elements are provided to ensure that possible defects do not lead to impaired operation. For example, an overpressure relief valve 20 is placed in parallel with the diaphragm 17 and will open in the event of the diaphragm 17 becoming clogged or icing up, thus limiting the pressure drop across the diaphragm.

A mechanical stop 26 limits the upwards travel of the spool 30—i.e. movement in a direction which increases the opening of the adjustable port 19. The stop 26 will limit the permissible return delivery at the exit of the bottom half-chamber in the event of the pressure difference Psf–Pb dropping below a minimum value. The stop 26 will therefore guarantee a delivery margin to the engine fuel injectors between speeds ranging from idling to full throttle operation, but could riot guarantee this margin for in-flight re-ignition.

Preferably, the stop 26 is in the form of a screw introduced into a tapped aperture parallel to the direction of spool movement. The position of the stop 26 can then be adjusted.

In an embodiment which also provides improved control of pump bearing cooling, the bottom half-chamber has a second outlet port 29 for partially supplying the cooling exchanger of the pump bearings. The port 29 is so positioned as to be closed i.e., completely masked by the piston 33—at low engine speeds—i.e., the port 29 is completed masked by the piston 33 when the opening of the port 19 is reduced.

When engine speed increases, the pressure Pb increases and the equilibrium position of the piston 33 rises, thus releasing a delivery of fuel for pump bearing cooling. Suppressing the cooling delivery at low engine speeds leads to readier optimisation of pump bearing cooling at high speeds.

We claim:

1. In a fuel supply circuit of an aircraft engine including fuel injectors and a plurality of servovalves, a low pressure pump for raising the pressure of fuel from a tank from a pressure Pca to a pressure Pb, and a high pressure pump and filter for further raising the pressure of the fuel to a pressure Psf at the outlet of said filter, a process for controlling the pressure and delivery of fuel to said plurality of servovalves comprising the steps of:

controlling the high pressure pump delivery so that, whatever the engine speed, the delivery from said high pressure pump corresponds to the sum of the delivery required by said fuel injectors at said engine speed and the prevailing flight conditions and the delivery which would be required by said plurality of servovalves if all of said servovalves operate simultaneously using the maximum delivery usable at said engine speed;

placing a servovalve feed unit downstream of a fuel injector feed unit and in communication with a compartment having an opening which is variable in dependence upon the position of a movable closure member; and, causing said closure member to move to vary said opening in response to opposing first and second groups of forces, said first group of forces acting in the closing direction and comprising a resilient force, a force proportional to the pressure Pca, and a force proportional to a first pressure, and said second group of forces acting in the opening direction and comprising a force proportional to the pressure Pb, and a force proportional to a second pressure less than the first pressure and at a substantially constant difference therefrom.

* * * * *

UNITED STATES PATENT AND TRADEMARK OFFICE
CERTIFICATE OF CORRECTION

PATENT NO. : 6,568,189 B2
DATED : May 27, 2003
INVENTOR(S) : Marie-Trinite R. Blot-Carretero et al.

It is certified that error appears in the above-identified patent and that said Letters Patent is hereby corrected as shown below:

Title page,
Item [54], Title, insert -- DEVICE AND -- before "PROCESS".

Column 4,
Line 48, change "range.." to -- range. --.

Signed and Sealed this

Second Day of March, 2004

JON W. DUDAS
*Acting Director of the United States Patent and Trademark Office*